United States Patent [19]
Takatsu

[11] Patent Number: 6,032,167
[45] Date of Patent: Feb. 29, 2000

[54] DATA PROCESSING CIRCUIT ADAPTED FOR USE IN PATTERN MATCHING

[75] Inventor: Motomu Takatsu, Kawasaki, Japan

[73] Assignee: Fujitsu Limited, Kawasaki, Japan

[21] Appl. No.: 09/044,973

[22] Filed: Mar. 20, 1998

[30] Foreign Application Priority Data

Apr. 30, 1997 [JP] Japan ................................. 9-112842

[51] Int. Cl.[7] ...................................................... G06F 15/00
[52] U.S. Cl. ........................... 708/424; 345/121; 708/814
[58] Field of Search ..................................... 345/121, 137, 345/138; 708/5, 404, 405, 422, 424, 445, 605, 805, 812, 814

[56] References Cited

U.S. PATENT DOCUMENTS

| | | | |
|---|---|---|---|
| 4,334,282 | 6/1982 | Whitehouse | 708/426 |
| 4,739,265 | 4/1988 | Yamamoto et al. | 324/309 |
| 5,341,460 | 8/1994 | Tam | 345/419 |
| 5,495,428 | 2/1996 | Schwartz | 382/164 |
| 5,579,338 | 11/1996 | Kojima | 375/208 |

*Primary Examiner*—John A. Follansbee
*Assistant Examiner*—Dzung Nguyen
*Attorney, Agent, or Firm*—Staas & Halsey LLP

[57] ABSTRACT

A data processing circuit adapted for use in pattern matching between two sets of multi-dimensional signal data. The data processing circuit performs integration-based conversion on data aw calculated by multiplying first multi-dimensional signal data a by a window function w, second multi-dimensional signal data b, data $b^2$ calculated by squaring the data b, and the window function w, calculates a correlation between the first and second multi-dimensional signal data items a and b on the basis of the data aw and data b subjected to integration-based conversion, calculates a means of deviations from the square of the second multi-dimensional signal data b on the basis of the data $b^2$ and window function subjected to integration-based conversion, and calculates a portion of the second multi-dimensional signal data b most consistent with the first multi-dimensional signal data a multiplied by the window function w. Owing to this processing, a motion vector (magnitude of movement) can be detected by carrying out a small number of arithmetic operations while hardly being affected by the variation of a signal representing the multi-dimensional signal data used for comparison. This contributes to high-precision pattern matching.

15 Claims, 8 Drawing Sheets

Fig.7

DATA PROCESSING CIRCUIT ADAPTED FOR USE IN PATTERN MATCHING

BACKGROUND OF THE INVENTION

1. Field of the Invention

The present invention relates to a technique of pattern matching for detecting common data in two multi-dimensional signal data items. More particularly, this invention is concerned with a data processing circuit useful for detecting a portion of one data item with which a portion of another data item is most consistent and detecting a magnitude of displacement (magnitude of movement) of one data item relative to another data item.

An art provided by the present invention can be adapted to, for example, motion detection for moving pictures or pattern recognition. The present invention can apply to one-dimensional data, two-dimensional data, or three-dimensional data, or generally, to multi-dimensional data as long as integral transform is carried out properly according to the number of the dimensions of the input data. The higher the number is, the larger the effect that can be expected. The subsequent description will be made by taking two-dimensional image data items as examples in consideration of the current situation in the market.

2. Description of the Related Art

For compressing data representing a moving picture, "motion compensation" is generally carried out. As far as a moving picture is concerned, when a current picture is segmented into areas, images in almost all the areas are not very different from images in corresponding areas in a previous picture which have been moved in a parallel way. From this viewpoint, once the magnitude of the movement is detected, what is needed in addition is data concerning minute differences between images moved in parallel and original images. This enable considerable data compression. Even the MPEG systems that have become international standards adopt "motion compensation" as the basis of image data compression.

For controlling a movable robot or driving a motor car automatically, it is necessary to measure a vector representing the velocity of an object in a camera picture. Based on the velocity vector, movement or drive is controlled. Moreover, even an automatic tracking camera for tracking a moving object in line with the movement requires "motion" detection.

For measuring the "motion," two-dimensional correlation is employed. Specifically, an area in a previous picture is moved by a vector ($\Delta X$, $\Delta Y$) two-dimensionally, and correlated two-dimensionally with a corresponding area in a current picture. A magnitude of movement ($\Delta X$, $\Delta Y$) maximizing the correlation is detected. The magnitude is the magnitude of a motion vector or a vector representing a "motion."

Assuming that a signal representing a pixel (x, y) in an area in a current picture is regarded as a(x, y), a signal representing a pixel in an area in a previous picture which is moved by a magnitude of movement ($\Delta X$, $\Delta Y$) is regarded as b(x−$\Delta X$, y−$\Delta Y$), the two-dimensional correlation between the corresponding areas is provided as a sum of absolute values of differences between two signals of the signals representing all pixels within the areas (See the expression (1)) or a sum of products between two signals (See the expression (2)).

$$C(\Delta X, \Delta Y) = \Sigma_x \Sigma_y |a(x, y) - b(x-\Delta X, y-\Delta Y)| \quad (1)$$

$$C(\Delta X, \Delta Y) = \Sigma_x \Sigma_y a(x, y) \, b(x-\Delta X, y-\Delta Y) \quad (2)$$

These two-dimensional correlations are generally obtained by carrying out arithmetic operations in the real space so as to calculate the expressions. For the expression (2), a Fourier transform can be employed.

The expression (1) is expected to be minimum, when areas in previous and current pictures become consistent with each other. The expression (2) is expected to be maximum, when intensities of the areas in the previous and current pictures have a proportional relationship.

Using evaluation function of two-dimensional correlation given by the expression (1), a motion vector minimizing the difference between signals representing pixels in areas in previous and current pictures is detected. The evaluation function is suitable for a system in which both a motion vector (magnitude of movement) and difference signal (data indicating a difference between signals) are supplied, such as, to an MPEG system.

However, assuming that the size of areas to be correlated is N*N (where * means multiplication), and the size of areas exhibiting a motion vector to be detected is L*L, an arithmetic operation for calculating absolute values, subtraction, and addition, must be performed $N^7 L^2$ times. This leads to a drawback in that the number of arithmetic operations becomes very large.

By contrast, in the arithmetic operations needed to calculate a two-dimensional correction given by the expression (2), when a Fourier transform is employed, the number of arithmetic operations to be carried out is in the order of $(N+L)^2 \log(N+L)$. This leads to an advantage that the number of arithmetic operations can be minimized.

However, the evaluation function provided as a sum of products between two signals has a problem in that signals are incorrectly matched with signals representing pixels in a bright area. As is apparent from the expression (2), when b(x−$\Delta X$, y−$\Delta Y$) is large, even if the correlation with a(x, y) is small C($\Delta X$, $\Delta Y$) becomes a large value. Specifically, the distribution of signals b(x−$\Delta X$, y−$\Delta Y$) varies depending on $\Delta X$ and $\Delta Y$. This means that some normalization is needed.

SUMMARY OF THE INVENTION

An object of the present invention is to provide a data processing circuit making it possible to detect a motion vector (magnitude of movement) by carrying out a small number of arithmetic operations, the circuit being hardly affected by a change in signal level of multi-dimensional signal data used for comparison during pattern matching between two multi-dimensional signal data items, and eventually contributing to high-precision pattern matching.

Figure 1:
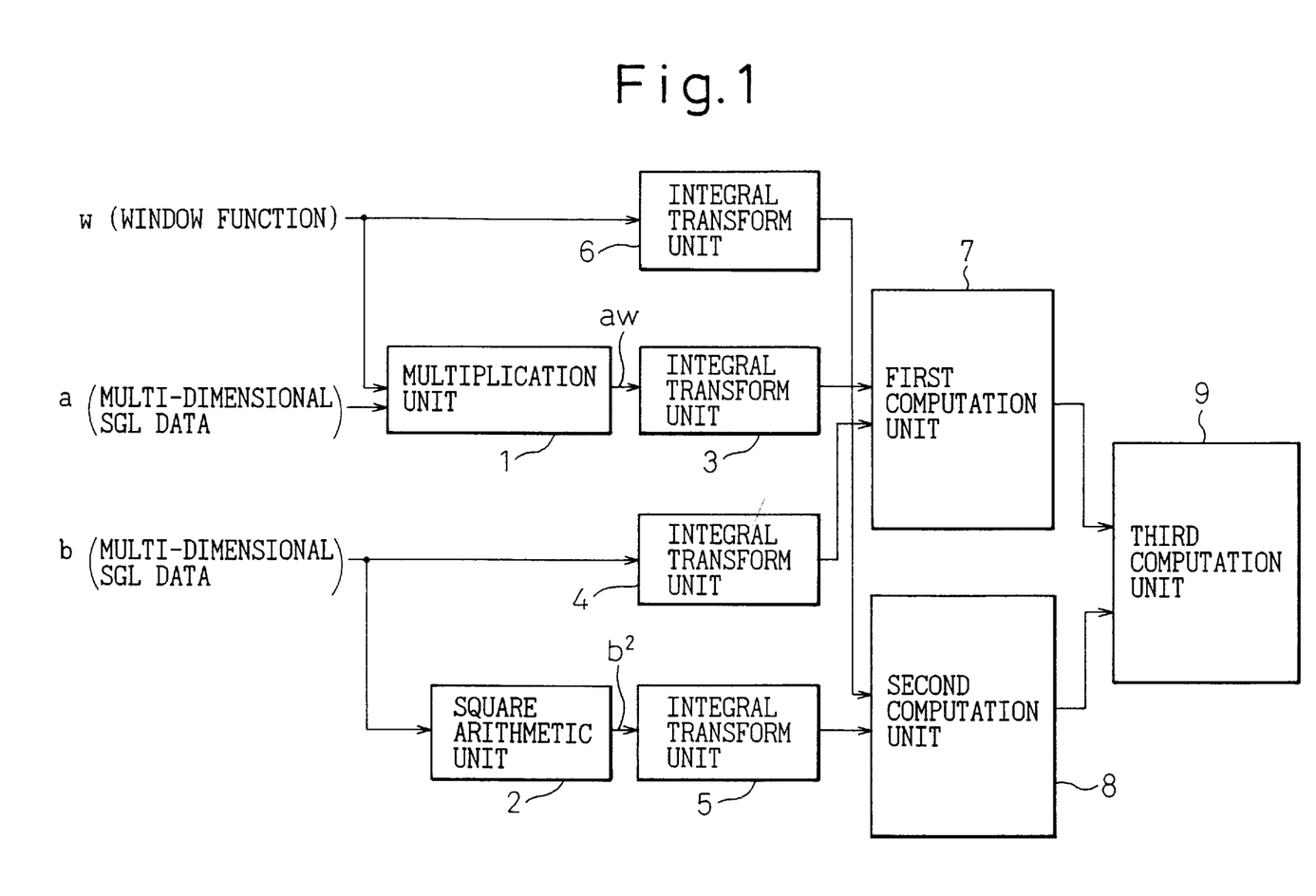
FIG. 1 is a block diagram showing the principles and configuration of a data processing circuit for pattern matching in accordance with the present invention.

A data processing circuit for pattern matching in accordance with the present invention comprises, as shown in the block diagram of FIG. 1 showing the principles of the present invention: a multiplication unit 1 for multiplying first multi-dimensional signal data (data concerned) a by a given window function w; a square arithmetic unit 2 for calculating the square of second multi-dimensional signal data (data used for comparison) b; an integral transform unit 3 for integrating an output aw of the multiplication unit 1 for conversion; an integral transform unit 4 for integrating the second multi-dimensional signal data b for conversion; an integral transform unit 5 for integrating an output $b^2$ of the square arithmetic unit 2 for conversion; an integral transform unit 6 for integrating the window function w for conversion; a first computation unit 7 for calculating the correlation between the first and second multi-dimensional signal data items a and b on the basis of the outputs of the integral transform units 3 and 4; a second computation unit 8 for calculating a mean of the deviations from the square of the second multi-dimensional signal data b on the basis of the outputs of the integral transform units 5 and 6; and a third computation unit 9 for obtaining a portion of the second multi-dimensional signal data b most consistent with the first multi-dimensional signal data a multiplied by the window function w (that is, data aw) on the basis of the outputs of the first computation unit 7 and second computation unit 8. However, the multiplication unit 1 and integral transform unit 6 may be excluded in practice as described later.

Now, the principles of the data processing circuit in accordance with the present invention will be described.

To begin with, an evaluation function or a function useful in evaluating consistency (pattern matching) will be defined as described below.

According to the MPEG system or the like, a difference signal resulting from motion compensation (that is, data indicating a difference between an area in a current picture and a corresponding area in a previous picture) should be low in level. The aforesaid expression (1) provides a motion vector minimizing a first-order norm of the difference signal. However, a method of minimizing a second-order norm which is given by the expression (3) below would be useful in terms of minimizing the power of the difference signal.

$$C(\Delta X, \Delta Y) = \Sigma_x \Sigma_y [a(x, y) - b(x - \Delta X, y - \Delta Y)]^2 \quad (3)$$

However, as long as this expression is used, the number of arithmetic operations is not reduced. The expression is therefore developed into the expression (3') below.

$$C(\Delta X, \Delta Y) = \Sigma_x \Sigma_y a(x, y)^2 - 2\Sigma_x \Sigma_y a(x, y) b(x-\Delta X, y-\Delta Y) + \Sigma_x \Sigma_y b(x-\Delta X, y-\Delta Y)^2 \quad (3')$$

Since the first term provides a constant independent of $\Delta X$ and $\Delta Y$, it is omitted. The signs of the subsequent terms are then reversed. This results in the expression below.

$$C(\Delta X, \Delta Y) = 2S_{ab}(\Delta X, \Delta Y) - S_b(\Delta X, \Delta Y) \quad (4)$$

$\Delta X$ and $\Delta Y$ maximizing this expression are obtained. Herein, $S_{ab}$ corresponds to a covariance of a and b (on the assumption that the means of a and b are 0), and $S_b$ corresponds to a self-variance of b (on the assumption that the means of a and b are 0). The expressions below (5) and (6) are induced from the expression (4).

$$S_{ab}(\Delta X, \Delta Y) = \Sigma_x \Sigma_y a(x, y) b(x-\Delta X, y-\Delta Y) \quad (5)$$

$$S_b(\Delta X, \Delta Y) = \Sigma_x \Sigma_y b(x-\Delta X, y-\Delta Y) \quad (6)$$

Thus, once a Fourier transform is used, $S_{ab}(\Delta X, \Delta Y)$ can, as mentioned previously, be calculated by carrying out a small number of arithmetic operations. Moreover, $S_b(\Delta X, \Delta Y)$ can also be calculated by carrying out a small number of arithmetic operations as described later.

For matching data of an image, of which overall brightness varies time-passingly, with previous data in consideration of a variation of brightness, it is reasonable to minimize $a(x, y) - c(\Delta X, \Delta Y)b(x-\Delta X, y-\Delta Y)$ where $c(\Delta X, \Delta Y)$ is a proportional coefficient. When the least squares method is employed, errors from least squares are expressed as follows:

$$C(\Delta X, \Delta Y) = \Sigma_x \Sigma_y a(x, y)^2 - S_{ab}(\Delta X, \Delta Y)^2 / S_b(\Delta X, \Delta Y)$$

Since the first term provides a constant independent on $\Delta X$ and $\Delta Y$, it is omitted. The sign of the subsequent term is reversed. This results in the following expression:

$$C(\Delta X, \Delta Y) = S_{ab}(\Delta X, \Delta Y)^2 / S_b(\Delta X, \Delta Y) \quad (7a)$$

$\Delta X$ and $\Delta Y$ maximizing the expression (7a) are then obtained. All that is needed includes $S_{ab}(\Delta X, \Delta Y)$ and $S_b(\Delta X, \Delta Y)$. The employment of a Fourier transform or the like can reduce the number of arithmetic operations.

However, the calculation of the expression (7a) does not always enable discrimination of a positive correlation from a negative correlation. For the discrimination, the expression (7b) below providing the square root of the expression (7a) may be employed.

$$C(\Delta X, \Delta Y) = S_{ab}(\Delta X, \Delta Y)/S_b(\Delta X, \Delta Y)^{1/2} \quad (7b)$$

Alternatively, the expression (7a') below that is a variant of the expression (7a) may be employed.

$$C(\Delta X, \Delta Y) = \text{Sign}[S_{ab}(\Delta X, \Delta Y)]S_{ab}(\Delta X, \Delta Y)^2/S_b(\Delta X, \Delta Y) \quad (7a')$$

where $\text{sign}[S_{ab}(\Delta X, \Delta Y)]$ is a sign function or a function of a sign that becomes 1 when $S_{ab}(\Delta X, \Delta Y)$ is positive and −1 when $S_{ab}(\Delta X, \Delta Y)$ is negative.

The evaluation function does not take account of a difference between the means of a and b. When data is matched with previous data in consideration of the difference, $a(x, y) - m_a$ should be substituted for $a(x, y)$ and $b(x-\Delta X, y-\Delta Y) - m_b(\Delta X, \Delta Y)$ should be substituted for $b(x-\Delta X, y-\Delta Y)$. Herein, $m_a$ is a mean of values of a within an area, and $m_b$ is a mean of values of b within the area. In this case, $S_{ab}(\Delta X, \Delta Y)$ and $S_b(\Delta X, \Delta Y)$ correspond to a normal covariance and self-variance respectively and are provided as the expressions (8) and (9) below.

$$S_{ab}(\Delta X, \Delta Y) = \Sigma_x \Sigma_y a(x, y) b(x-\Delta X, y-\Delta Y) - n m_a m_b(\Delta X, \Delta Y) \quad (8)$$

$$S_b(\Delta X, \Delta Y) = \Sigma_x \Sigma_y b(x-\Delta X, y-\Delta Y)^2 - n m_b(\Delta X, \Delta Y)^2 \quad (9)$$

The means $m_a$ and $m_b(\Delta X, \Delta Y)$ are provided as the expressions (10) and (11) below.

$$m_a = \Sigma_x \Sigma_y a(x, y)/n \quad (10)$$

$$m_b(\Delta X, \Delta Y) = \Sigma_x \Sigma_y b(x-\Delta X, y-\Delta Y)/n \quad (11)$$

where n denotes the number of elements in the area, that is, $(N_x * N_y)$. Even in this case, when the evaluation function provided as the expression (4) or (7a) is employed, motion detection can be achieved by carrying out a small number of arithmetic operations.

Next, how to handle data for the integral transform performed by the integral transform units 3 to 6 will be described. For brevity's sake, x and y shall be integers.

For the aforesaid expressions (1) to (9), x ranges from $x_1$ to $x_2$ ($x_2 - x_1 = N_x - 1$), y ranges from $y_1$ to $y_2$ ($y_2 - y_1 = N_y - 1$), $\Delta X$ ranges from $\Delta X_1$ to $\Delta X_2$ ($\Delta X_2 - \Delta X_1 = L_x - 1$), and $\Delta Y$ ranges from $\Delta Y_1$ to $\Delta Y_2$ ($\Delta Y_2 - \Delta Y_1 = L_y - 1$). However, when $\Delta X$ and $\Delta Y$ vary, $b(x-\Delta X, y-\Delta Y)$ varies. Therefore, the number of arithmetic operations required for integral transform cannot be reduced.

According to the present invention, therefore, a new system of coordinates $x' = x - \Delta X$ ($x'$ ranges from $x_1 - \Delta X_2$ to $x_2 - \Delta X_1$) and $y' = y - \Delta Y$ ($y'$ ranges from $y_1 - \Delta Y_2$ to $y_2 - \Delta Y_1$) is introduced in order to cover all required values of $b(x-\Delta X, y-\Delta Y)$. Moreover, a window function $w(x, y)$ given by the expression below is introduced. The window function becomes 0 when x and y exceed the aforesaid ranges.

$$w(x, y) = 1 (x_1 \leq x \leq x_2, y_1 \leq y \leq y_2)$$

w(x, y)=0 (when x and y exceed the above ranges) In this case, in the aforesaid expressions, $\Sigma_x\Sigma_y w(x'+\Delta X, y'+\Delta Y)$ should be substituted for $\Sigma_x\Sigma_y$. For example, the expressions (5), (6), (8), (9), and (11) are rewritten as follows:

$$S_{ab}(\Delta X, \Delta Y) = \Sigma_x\Sigma_y w(x'+\Delta X, y'+\Delta Y) a(x'+\Delta X, y'+\Delta Y) * b(x', y') \quad (5')$$

$$S_b(\Delta X, \Delta Y) = \Sigma_x\Sigma_y w(x'+\Delta X, y'+\Delta Y) b(x', y')^2 \quad (6')$$

$$S_{ab}(\Delta X, \Delta Y) = \Sigma_x\Sigma_y w(x'+\Delta X, y'+\Delta Y)$$
$$a(x'+\Delta X, y'+\Delta Y) * b(x', y') - \quad (8')$$
$$nm_a m_b(\Delta X, \Delta Y)$$

$$S_b(\Delta X, \Delta Y) = \Sigma_x\Sigma_y w(x'+\Delta X, y'+\Delta Y) b(x', y')^2 - nm_b(\Delta X, \Delta Y)^2 \quad (9')$$

$$m_b(\Delta X, \Delta Y) = \Sigma_x\Sigma_y (x'+\Delta X, y+\Delta Y) b(x', y')/n \quad (11')$$

Data processing to be performed when a Fourier transform is adopted for integral transform will be described below.

To begin with, discrete Fourier transforms of p(x, y) and q(x, y) within a range of $N_x * N_y$ are expressed as $F\{p\} = P(k_x, k_y)$ and $F\{q\} = Q(k_x, K_y)$ respectively. Accordingly, a discrete Fourier transform of $\Sigma_x\Sigma_y (x'+x, y'+y)q(x', y)$ is expressed as $P(k_x, k_y)Q(-k_x, -k_y)$ with coefficient excluded. However, when coordinates (x'+x, y'+y) exceed the range of $N_x * N_y$, the periodicity of $p(x+N_x, y) = p(x, y+N_y) = p(x, y)$ which is a property supposed to be exhibited by the discrete Fourier transforms is utilized in order to reduce the coordinates so that the coordinates fall within the range of $N_x * N_y$.

For calculating $\Sigma_x\Sigma_y (x'+x, y'+y) q(x', y')$, discrete Fourier transforms of p(x, y) and q(x, y) are calculated separately and then multiplied mutually in order to obtain a discrete Fourier transform of $\Sigma_x\Sigma_y p(x'+x, y'+y) q(x', y')$. The discrete Fourier transform is then subjected to a discrete inverse Fourier transform.

This method provides a correlation within the range of $N_x * N_y$. However, there is a possibility that an error may occur because of the "periodicity" supposed to be exhibited by the discrete Fourier transforms.

According to the present invention, as mentioned above, since data representing one image (first multi-dimensional signal data a) is multiplied by the window function w, the error can be avoided. A function providing, for example, 1 relative to an area of $N_x * N_y$ and 0 relative to any other area is used as the window function. When the aforesaid arithmetic operations are carried out relative to a range of $(N_x + L_x) * (N_y + L_y)$, a correct correlation is obtained for a motion vector relative to the range of $L_x * L_y$.

For calculating the expression (5'), a(x, y)*w(x, y) and b(x, y) are associated with p(x, y) and q(x, y) respectively. A Fourier transform, multiplication, and an inverse Fourier transform are then carried out. Likewise, for calculating the expression (6'), w(x, y) and b7(x, y) are associated with p(x, y) and q(x, y) respectively.

Using the results of the calculations, an evaluation function can be obtained in the form of the expression (4) or (7a). When the expression (4) is used as the evaluation function, a procedure in which a difference between a Fourier transform of the expression (5) and a Fourier transform of the expression (6) is calculated and then subjected to inverse Fourier transform gains an advantage over a procedure in which the expressions (5) and (6) are calculated according to the aforesaid procedure and then a difference is calculated. This is because the former procedure permits a reduction in number of arithmetic operations for inverse Fourier transform.

As mentioned above, when a Fourier transform is used for integral transform, the number of arithmetic operations to be performed for a one-dimensional Fourier transform and an inverse Fourier transform on N data items of real numbers is N log N operations of multiplication and addition. Moreover, a two-dimensional Fourier transform can be realized by a combination of a one-dimensional Fourier transform performed in the x direction and a one-dimensional Fourier transform performed in the y direction. From this viewpoint, the number of arithmetic operations required is in the order of $(N_x+L_x)(N_y+L_y)\log[(N_x+L_x)(N_y+L_y)]$.

Integral transform to be achieved using a Fourier transform has been described. The same advantage can be expected even when a Hough transform is substituted for a Fourier transform. In this case, the fact that the Hough transform of the two-dimensional correlation $\Sigma_x\Sigma_y p(x'+x, y'+y) q(x', y')$ can be obtained by calculating a one-dimensional correlation between Hough transforms of p(x, y) and q(x, y) is utilized in relation to the expressions (5') and (6'). Specifically, the Hough transforms of p(x, y) and q(x, y) are calculated and expressed as $H\{p\}=Ph(\rho, \theta)$ and $H\{q\}=Qh(\rho, \theta)$ respectively. Consequently, the Hough transform of $\Sigma_x\Sigma_y p(x'+x, y'+y) q(x', y')$ is expressed as $\Sigma_\rho Ph(\rho, \theta)Qh(\rho+\rho', \theta)$ with constants excluded. In this case, the Hough transform can be calculated by carrying out about $(N+L)^2 L$ arithmetic operations. Similarly to when a Fourier transform is employed, a two-dimensional correlation can be obtained by carrying out a small number of arithmetic operations. In other words, a motion vector can be detected with a small number of arithmetic operations.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 2:
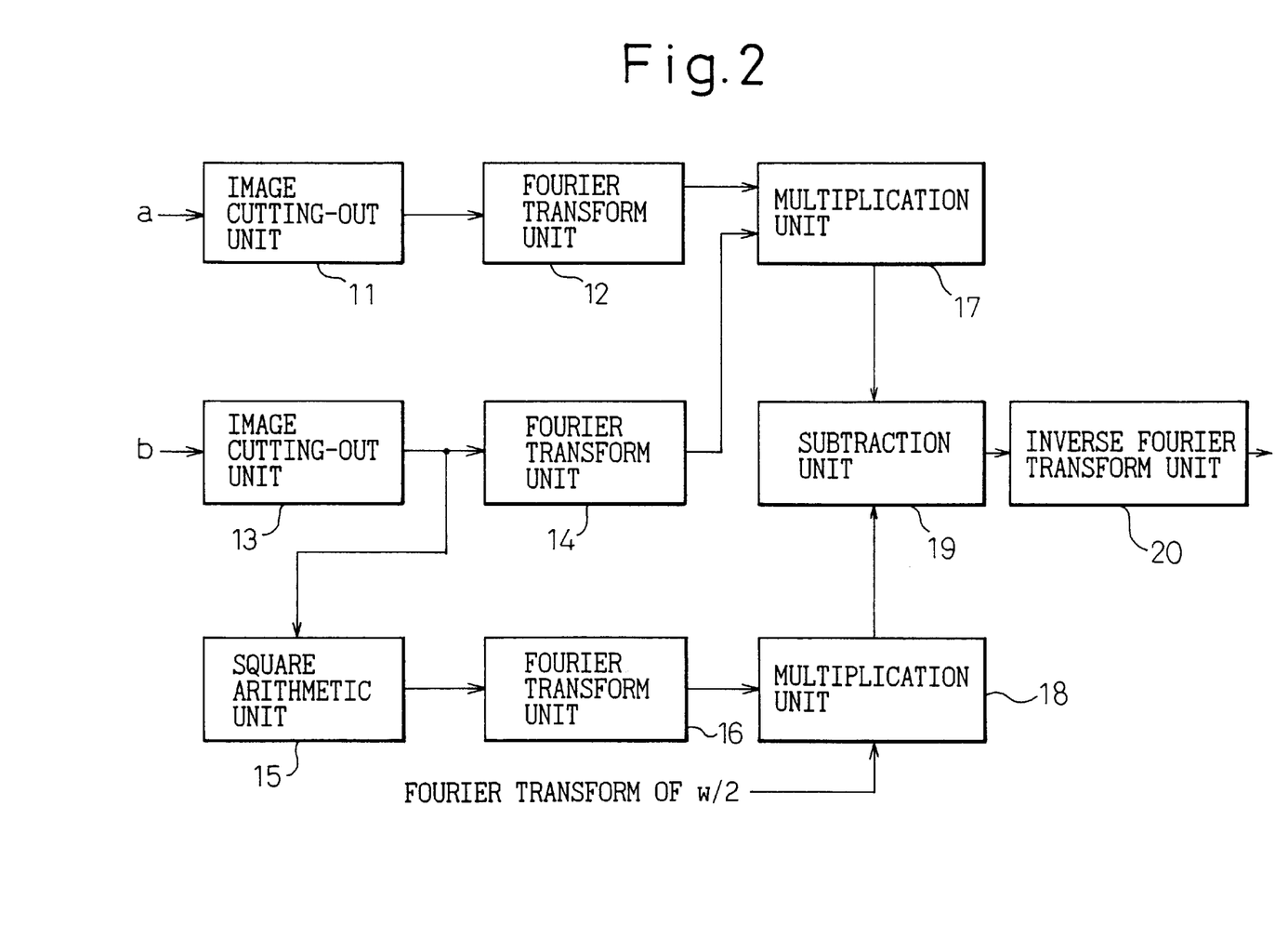
FIG. 2 is a block diagram showing the configuration of a correlation circuit serving as a data processing circuit in accordance with the first embodiment of the present invention.

FIG. 2 shows the configuration of a correlation circuit serving as a data processing circuit in accordance with the first embodiment of the present invention. Shown as an example is the configuration in which a Fourier transform is used for integral transform.

In the drawing, there are shown first two-dimensional image data a, second two-dimensional image data b, and a window function w (w/2 in this embodiment). In this embodiment as well as subsequent embodiments, the range of the image data items a and b shall be $(N_x+L_x)*(N_y+L_y)$.

The correlation circuit of this embodiment comprises, as illustrated, an image cutting-out unit 11 responsive to the two-dimensional image data a, a Fourier transform unit 12 responsive to the output of the image cutting-out unit 11, an image cutting-out unit 13 responsive to the two-dimensional image data b, a Fourier transform unit 14 and square arithmetic unit 15 responsive to the output of the image cutting-out unit 13, a Fourier transform unit 16 responsive to the output of the square arithmetic unit 15, a multiplication unit 17 responsive to the outputs of the Fourier transform units 12 and 14, a multiplication unit 18 responsive to the output of the Fourier transform unit 16 and a signal representing a Fourier transform of the window function w/2, a subtraction unit 19 for calculating a difference between the outputs of the multiplication units 17 and 18, and an inverse Fourier transform unit 20 responsive to the output of the subtraction unit 19. Using this configuration, an evaluation function given by the expression (4) is produced.

To be more specific, owing to the above configuration, the two-dimensional image data a is input to the image cutting-out unit 11. A portion $N_x*N_y$ of the data representing an image to be compared is cut out and input to the Fourier transform unit 12. Cutting out the portion $N_x*N_y$ corresponds to multiplication by the window function w. This obviates, as mentioned above, multiplication by the window function w. The Fourier transform unit 12 carries out one-dimensional Fourier transform NV times on $N_x+L_y$ data items in the direction of one coordinate axis (x-axis direction), then carries out a one-dimensional Fourier transform $N_x+L_x$ times on $N_y+L_y$ data items in the direction of the other coordinate axis (y-axis direction), and thus achieves a two-dimensional Fourier transform. At this time, since $L_x$ inputs are 0s, the number of arithmetic operations required for the first one-dimensional Fourier transform can be reduced.

Likewise, the two-dimensional image data b is input to the image cutting-out unit 13. A portion $(N_x+L_x)*(N_y+L_y)$ of the data representing an image to be compared is cut out and input to the Fourier transform unit 14. The Fourier transform unit 14 carries out a one-dimensional Fourier transform $N_y+L_y$ times on $N_x+L_x$ data items in the direction of one coordinate axis (x-axis direction), then carries a out one-dimensional Fourier transform $N_x+L_x$ times on $N_y+L_y$ data items in the direction of the other coordinate axis (y-axis direction), and thus achieves a two-dimensional Fourier transform.

After the portion of the two-dimensional image data b representing an image to be compared is cut out by the image cutting-out unit 13, the portion is squared by the square arithmetic unit 15 and then subjected to a two-dimensional Fourier transform, as mentioned above, by the Fourier transform unit 16.

Fourier transforms output from the Fourier transform units 12 and 14 are input to the multiplication unit 17. Corresponding frequency components are multiplied mutually, whereby a Fourier transform of $S_{ab}$ is calculated. A Fourier transform output from the Fourier transform unit 16 and a Fourier transform of the window function w/2, which defines the cut-out area $N_x*N_y$ and is calculated and stored in advance, are input to the multiplication unit 18. Corresponding frequency components are mutually multiplied, whereby a Fourier transform of $S_b/2$ is calculated. The latter Fourier transform is a half of $S_b$ because of the Fourier transform of the window function is halved in advance. Since the Fourier transform of w is independent of an input, it is convenient to calculate and store the Fourier transform of w in advance.

Thereafter, the outputs of the multiplication units 17 and 18 are input to the subtraction unit 19, whereby a difference between the outputs is calculated. An inverse Fourier transform of the difference is then calculated by the inverse Fourier transform unit 20. This results in an evaluation function given by the expression (4).

Figure 3:
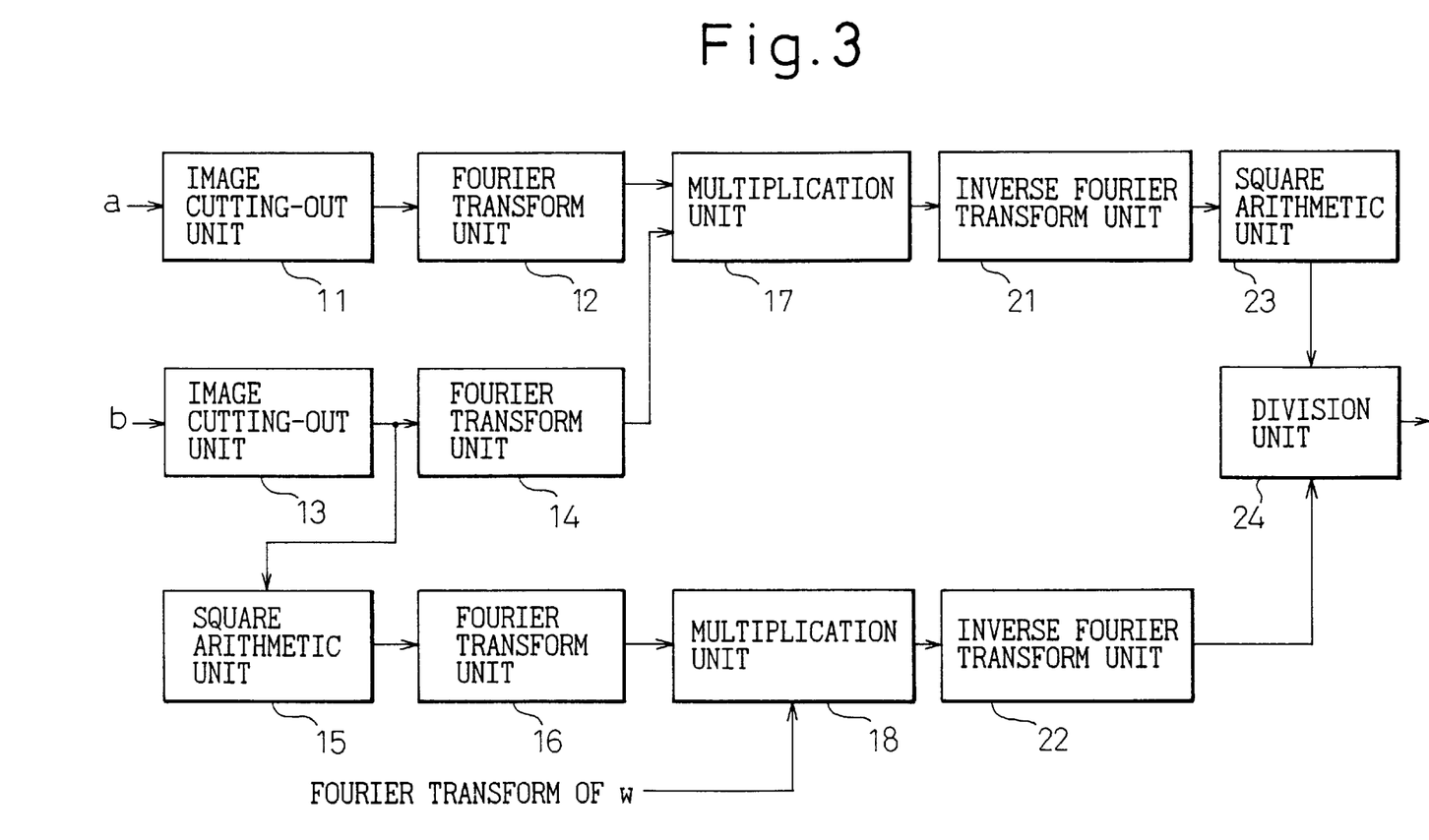
FIG. 3 is a block diagram showing the configuration of a correlation circuit serving as a data processing circuit in accordance with the second embodiment of the present invention.

FIG. 3 shows the configuration of a correlation circuit serving as a data processing circuit in accordance with the second embodiment of the present invention. This embodiment provides, like the first embodiment, a configuration in which a Fourier transform is used for integral transform.

The correlation circuit of this embodiment is characterized, in comparison with the first embodiment (See FIG. 2), in that the inverse Fourier transform units 21 and 22 responsive to the outputs of the multiplication units 17 and 18, a square arithmetic unit 23 responsive to the output of the inverse Fourier transform unit 21, and a division unit 24 for calculating the ratio of the output of the square arithmetic unit 23 to the output of the inverse Fourier transform unit 22 are substituted for the subtraction unit 19 and inverse Fourier transform unit 20. Owing to the configuration, an evaluation function given by the expression (7a) is provided.

The other circuit elements and their operation modes are identical to those in the first embodiment. The description of the other circuit elements and their operation modes will therefore be omitted.

If the square arithmetic unit 23 carries out a signed squaring operation instead of a normal squaring operation, the evaluation function given by the expression (7a') can be provided.

Figure 4:
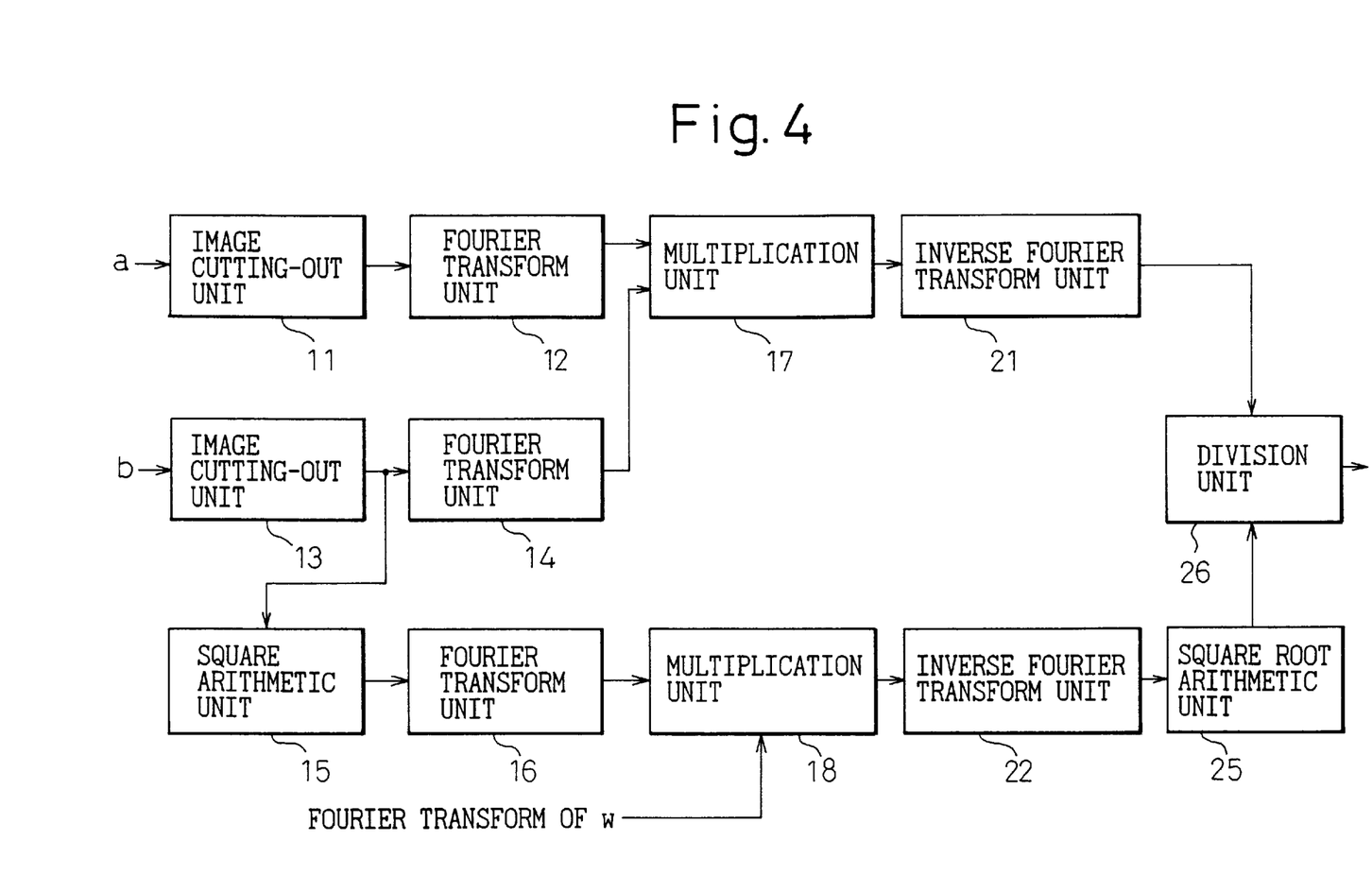
FIG. 4 is a block diagram showing the configuration of a correlation circuit serving as a data processing circuit in accordance with the third embodiment of the present invention.

FIG. 4 shows the configuration of a correlation circuit serving as a data processing circuit in accordance with the third embodiment of the present invention. Like the first and second embodiments, this embodiment provides the configuration in which a Fourier transform is used for integral transform.

The correlation circuit of this embodiment is characterized, in comparison with the second embodiment (See FIG. 3), in that a square root arithmetic unit 25 responsive to the output of the inverse Fourier transform unit 22 and a division unit 26 for calculating the ratio of the output of the inverse Fourier transform unit 21 to the output of the square root arithmetic unit 25 are substituted for the square arithmetic unit 23 and division unit 24. Owing to the configuration, the evaluation function given by the expression (7b) is provided.

The other circuit elements and their operation modes are identical to those in the second embodiment. The description of the other circuit elements and their operation modes is therefore omitted.

Figure 5:
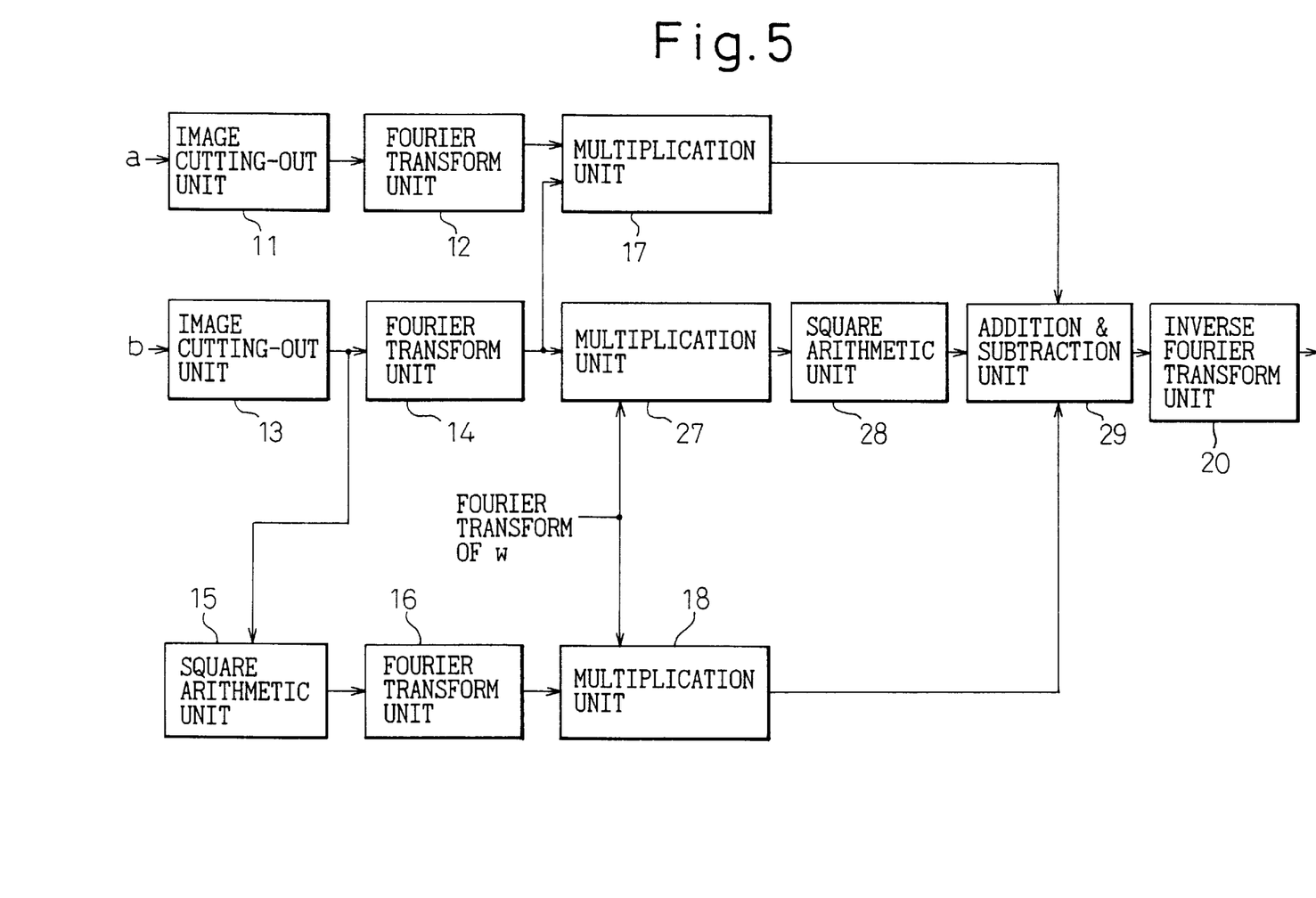
FIG. 5 is a block diagram showing the configuration of a correlation circuit serving as a data processing circuit in accordance with the fourth embodiment of the present invention.

FIG. 5 shows the configuration of a correlation circuit serving as a data processing circuit in accordance with the fourth embodiment of the present invention. This embodiment provides the configuration in which Fourier transform is used for integral transform and the variation of a direct-current component of input data is taken into account.

In this embodiment, the aforesaid expressions (8) and (9) are used to work out variances (covariance and self-variance) in consideration of the variation of a direct-current component.

The correlation circuit of this embodiment is characterized, in comparison with the first embodiment (See FIG. 2), in that a multiplication unit 27 responsive to the output of the Fourier transform unit 14 and a signal representing the Fourier transform of the window function w, a square arithmetic unit 28 responsive to the output of the multiplication unit 27, and an addition and subtraction unit 29 for carrying out addition and subtraction on the output of the square arithmetic unit 28 and the outputs of the multiplication units 17 and 18 and supplying an output to the inverse Fourier transform unit 20 are substituted for the subtraction unit 19. Owing to the configuration, the evaluation function given by the expression (4) is provided.

The other circuit elements and their operation modes are identical to those in the first embodiment. The description of the circuit elements and their operation modes will therefore be omitted.

Figure 6:
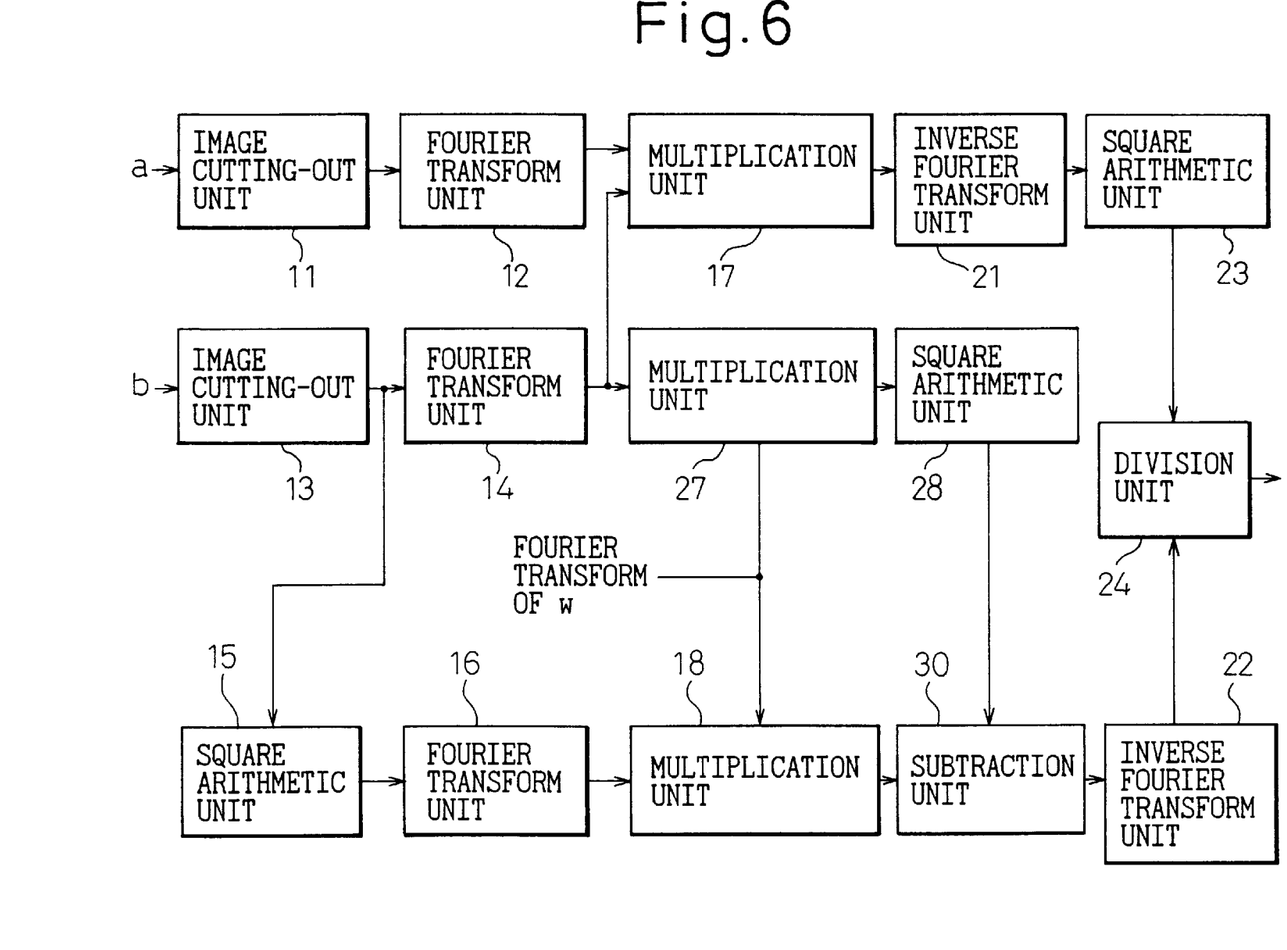
FIG. 6 is a block diagram showing the configuration of a correlation circuit serving as a data processing circuit in accordance with the fifth embodiment of the present invention.

FIG. 6 shows the configuration of a correlation circuit serving as a data processing circuit in accordance with the fifth embodiment of the present invention. This embodiment provides, like the fourth embodiment, a configuration in which a Fourier transform is used for integral transform and the variation of a direct-current component of input data is taken into account. Moreover, like the fourth embodiment, this embodiment employs the aforesaid expressions (8) and (9) giving variances.

The correlation circuit of this embodiment is characterized, in comparison with the second embodiment (See FIG. 3), in that a multiplication unit 27 responsive to the output of the Fourier transform unit 14 and a signal representing the Fourier transform of the window function w, a square arithmetic unit 28 responsive to the output of the multiplication unit 27, and a subtraction unit 30 for calculating the difference between the output of the square arithmetic unit 28 and the output of the multiplication unit 18, and supplying an output to the inverse Fourier transform unit 22 are further included. Owing to the configuration, the evaluation function given by the expression (7a) is provided.

The other circuit elements and their operation modes are identical to those in the second embodiment. The description of the circuit elements and their operation modes will therefore be omitted.

Figure 7:
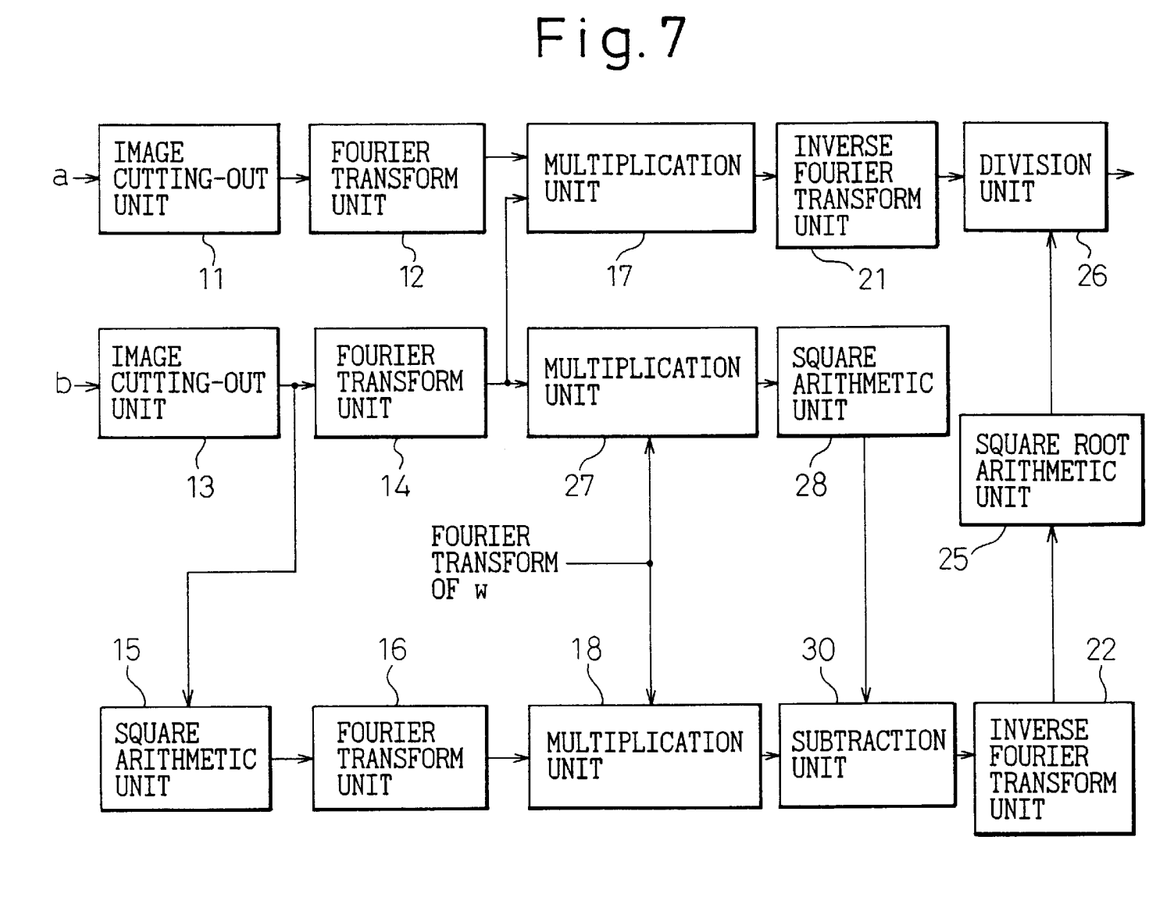
FIG. 7 is a block diagram showing the configuration of a correlation circuit serving as a data processing circuit in accordance with the sixth embodiment of the present invention.

FIG. 7 shows the configuration of a correlation circuit serving as a data processing circuit in accordance with the sixth embodiment of the present invention. This embodiment provides, like the fourth and fifth embodiments, a configuration in which a Fourier transform is used for integral transform and the variation of a direct-current component of input data is taken into account. Like the fourth and fifth embodiments, this embodiment employs the expressions (8) and (9) giving variances.

The correlation circuit of this embodiment is characterized, in comparison with the third embodiment (See FIG. 4), in that a multiplication unit 27 responsive to the output of the Fourier transform unit 14 and a signal representing the Fourier transform of the window function w, a square arithmetic unit 28 responsive to the output of the multiplication unit 27, and a subtraction unit 30 for calculating the difference between the output of the square arithmetic unit 28 and the output of the multiplication unit 18 and supplying an output to the inverse Fourier transform unit 22 are further included. Owing to the configuration, the evaluation function given by the expression (7b) is provided.

The other circuit elements and their operation modes are identical to those in the third embodiment. The description of the circuit elements and their operation modes will therefore be omitted.

Figure 8:
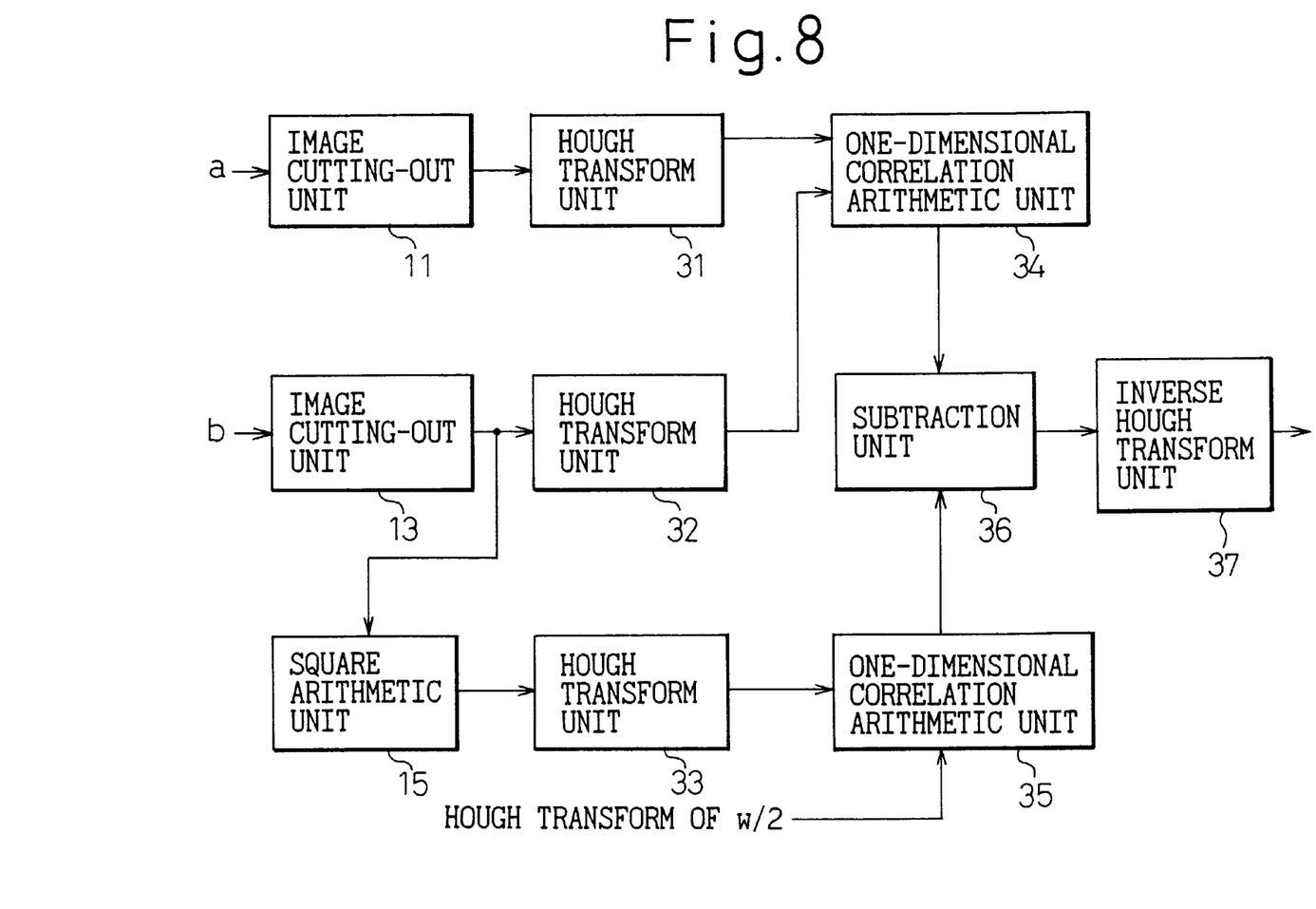
FIG. 8 is a block diagram showing the configuration of a correlation circuit serving as a data processing circuit in accordance with the seventh embodiment of the present invention.

FIG. 8 shows the configuration of a correlation circuit serving as a data processing circuit in accordance with the seventh embodiment of the present invention. This embodiment provides the configuration in which Hough transform is used for integral transform.

The correlation circuit of this embodiment is characterized in comparison with the first embodiment (See FIG. 2) in that Hough transform units 31, 32, and 33 are substituted for the Fourier transform units 12, 14, and 16, one-dimensional correlation arithmetic units 34 and 35 are substituted for the multiplication units 17 and 18, and a subtraction unit 36 and inverse Hough transform unit 37 are substituted for the subtraction unit 19 and inverse Fourier transform unit 20. Owing to the configuration, the evaluation function given by the expression (4) is provided.

When the other evaluation function is used, all that should be done is to exchange a Hough transform for a Fourier transform, exchange an inverse Hough transform for an inverse Fourier transform, and exchange correlation-oriented multiplication for one-dimensional correlation. A description of the configuration, that is not shown, will be omitted.

The present invention has been described in conjunction with the first to seventh embodiments. However, the present invention is not limited to these embodiments. For example, the constituent features of the embodiments may be combined properly. The combinations that are not shown will be readily conceived by a person with an ordinary skill in the art.

What is claimed is:

1. A data processing circuit adapted for use in pattern matching between two multi-dimensional signal data, comprising:

a unit for generating data calculated by multiplying first multi-dimensional signal data by a given window function;

a square arithmetic unit for calculating square of second multi-dimensional signal data;

first, second, third, and fourth integral transform units for integrating the first multi-dimensional signal data multiplied by the window function, the second multi-dimensional signal data, the output of said square arithmetic unit, and the window function;

a first computation unit for calculating correlation between the first and second multi-dimensional signal data items on the basis of the outputs of said first and second integral transform units;

a second computation unit for calculating a means of deviations from the square of the multi-dimensional signal data on the basis of the outputs of said third and fourth integral transform units; and a third computation unit for obtaining a portion of the second multi-dimensional signal data most consistent with the first multi-dimensional signal data multiplied by the window function based on the outputs of said first and second computation units.

2. The data processing circuit as set forth in claim 1, further comprising a fourth computation unit for calculating a mean of the second multi-dimensional signal data on the basis of the outputs of said second and fourth integral transform units, an output of said fourth computation unit being used to remove an influence of a mean of values of the second multi-dimensional signal data from the correlation or a of deviations from the square, wherein said third computation unit obtains a portion of the second multi-dimensional signal data most consistent with the first multi-dimensional signal data multiplied by the window function on the basis of the output of said fourth computation unit and the outputs of said first and second computation units.

3. The data processing circuit as set forth in claim 1, wherein said third computation unit assesses whether the first multi-dimensional signal data multiplied by the window function is consistent or inconsistent with the second multi-dimensional signal data and said third computation unit checks the difference between a double of the correlation and the mean of deviations from the square of the second multi-dimensional signal data.

4. The data processing circuit as set forth in claim 3, wherein said first to fourth integral transform units adopt a Fourier transform for integral transform and convert data from a real space into a space of wave numbers; said first computation unit multiplies Fourier transforms output from said first and second integral transform units in the space of wave numbers so as to calculate a Fourier transform of the correlation; said second computation unit multiplies Fourier transforms output from said third and fourth integral transform units in the space of wave numbers so as to calculate a Fourier transform of the means of deviations from the square; and said third computation unit performs inverse Fourier transform on Fourier transforms provided by said first and second computation units so as to obtain an evaluation function expressed in the real space.

5. The data processing circuit as set forth in claim 3, wherein said first to fourth integral transform units adopt a Hough transform for integral transform and convert data from a space of real numbers a space of elements $\rho$ and $\theta$; said first computation unit performs one-dimensional correlation in a direction of $\rho$ on Hough transforms output from said first and second integral transform units in the space of elements $\rho$ and $\theta$ so as to obtain a Hough transform of the correlation; said second computation unit performs one-dimensional correlation in a direction of $\rho$ on Hough transforms output from said third and fourth integral transform units in the space of elements $\rho$ and $\theta$ so as to obtain a Hough transform of the means of deviations from the square; and said third computation unit performs an inverse Hough transform on Hough transforms provided by said first and second computation units so as to obtain an evaluation function expressed in the space of real numbers.

6. The data processing circuit as set forth in claim 2, wherein when said third computation unit assesses whether the first multi-dimensional signal data multiplied by the window function is consistent or inconsistent with the second multi-dimensional signal data and said third computation unit checks the difference between a double of the correlation and the means of deviations from the square of the second multi-dimensional signal data.

7. The data processing circuit as set forth in claim 6, wherein said first to fourth integral transform units adopt a Fourier transform for integral transform and convert data from a real space into a space of wave numbers; said first computation unit multiplies Fourier transforms output from said first and second integral transform units in the space of wave numbers so as to obtain a Fourier transform of the correlation; said second computation unit multiplies Fourier transforms output from said third and fourth integral transform units in the space of wave numbers so as to obtain a Fourier transform of the mean of deviations from the square; and said third computation unit performs an inverse Fourier transform on Fourier transforms provided by said first and second computation units so as to obtain an evaluation function expressed in the space of real numbers.

8. The data processing circuit as set forth in claim 6, wherein said first to fourth integral transform units adopt a Hough transform for integral transform and convert data from a real space to a space of elements $\rho$ and $\theta$; said first computation unit performs one-dimensional correlation in a direction of $\rho$ on Hough transforms output from said first and second integral transform units in the space of elements $\rho$ and $\theta$; said second computation unit performs one-dimensional correlation in a direction of $\rho$ on Hough transforms output from said third and fourth integral transform units in the space of elements $\rho$ and $\theta$; and said third computation unit performs inverse Hough transform on Hough transforms provided by said first and second computation units so as to obtain an evaluation function expressed in the real space.

9. The data processing circuit as set forth in claim 1, wherein when said third computation unit evaluates whether the first multi-dimensional signal data multiplied by the window function is consistent or inconsistent with the second multi-dimensional signal data, and said third computation unit checks the ratio of the correlation to the square root of the mean of deviations from the square of the second multi-dimensional signal data or an equivalent value.

10. The data processing circuit as set forth in claim 9, wherein said first to fourth integral transform units adopt a Fourier transform for integration-based conversion and convert data from a space of real numbers into a space of wave numbers; said first computation unit multiplies Fourier transforms output from said first and second integral transform units in the space of wave numbers so as to obtain a Fourier transform of the correlation; said second computation unit multiplies Fourier transforms output from said third and fourth integral transform units in the space of wave numbers so as to obtain a Fourier transform of the means of deviations from the square; and said third computation unit performs an inverse Fourier transform on Fourier transforms provided by said first and second computation units so as to obtain an evaluation function expressed in the space of real numbers.

11. The data processing circuit as set forth in claim 9, wherein said first to fourth integral transform units adopt a Hough transform for integration-based conversion and convert data from a space of real numbers to a space of elements $\rho$ and $\theta$; said first computation unit performs one-dimensional correlation in a direction of $\rho$ on Hough transforms output from said first and second integral transform units in the space of elements $\rho$ and $\theta$ so as to obtain a Hough transform of the correlation; said second computation unit performs one-dimensional correlation in the direction of $\rho$ on Hough transforms output from said third and fourth integral transform units in the space of elements $\rho$ and $\theta$ so as to obtain a Hough transform of the mean of deviations from the square; and said third computation unit performs an inverse Hough transform on Hough transforms provided by said first and second computation units.

12. The data processing circuit as set forth in claim 2, wherein when said third computation unit assesses whether the first multi-dimensional signal data multiplied by the window function is consistent or inconsistent with the second multi-dimensional data and said third computation unit checks the ratio of the correlation to the square root of the mean of deviations from the square of the second multi-dimensional signal data or an equivalent value.

13. The data processing circuit as set forth in claim 12, wherein said first to fourth integral transform units adopt a Fourier transform for integration-based conversion and convert data from a space of real numbers into a space of wave numbers; said first computation unit multiplies Fourier transforms output from said first and second integral transform units in the space of wave numbers so as to obtain a Fourier transform of the correlation; said second computation unit multiplies Fourier transforms output from said third and fourth integral transform units in the space of wave numbers so as to obtain a Fourier transform of the mean of deviations from the square; and said third computation unit performs inverse Fourier transform on Fourier transforms provided by said first and second computation units so as to obtain an evaluation function expressed in the space of real numbers.

14. The data processing circuit as set forth in claim 12, wherein said first to fourth integral transform units adopt a Hough transform for integration-based conversion and convert data from a space of real numbers to a space of elements $\rho$ and $\theta$; said first computation unit performs one-dimensional correlation in a direction of $\rho$ on Hough transforms output from said first and second integral transform units in the space of elements $\rho$ and $\theta$ so as to obtain a Hough transform of the correlation; said second computation unit performs one-dimensional correlation in the direction of $\rho$ on Hough transforms output from said third and fourth integral transform units in the space of elements $\rho$ and $\theta$ so as to obtain a Hough transform of the correlation; said second computation unit performs one-dimensional correlation in the direction of $\rho$ on Hough transforms output from said third and fourth integral transform units in the space of elements $\rho$ and $\theta$ so as to obtain a Hough transform of the mean of deviations from the square; and said third computation unit performs an inverse Hough transform on Hough transforms provided by said first and second computation units so as to obtain an evaluation function expressed in the space of real numbers.

15. The data processing circuit as set forth in claim 1, wherein a function having a certain value relative to a portion of the first multi-dimensional signal data of which consistency with previous data should be detected, and having a value of 0 relative to the other portions, is used as said given window function.

* * * * *

UNITED STATES PATENT AND TRADEMARK OFFICE
CERTIFICATE OF CORRECTION

PATENT NO. : 6,032,167  
DATED : February 29, 2000  
INVENTOR(S) : Motomu Takatsu Page 1 of 1

It is certified that error appears in the above-identified patent and that said Letters Patent is hereby corrected as shown below:

Column 10,  
Line 46, after "calculating" insert -- a --;  
Line 53, after "calculating" insert -- a --;  
Line 57, change "means" to -- mean --.

Signed and Sealed this

Thirty-first Day of July, 2001

*Attest:*

*Attesting Officer*

NICHOLAS P. GODICI  
*Acting Director of the United States Patent and Trademark Office*